US010877652B2

(12) United States Patent
Neutra (10) Patent No.: US 10,877,652 B2
(45) Date of Patent: Dec. 29, 2020

(54) SYNCHRONIZING TIMED EVENTS WITH MEDIA

(71) Applicant: BOSE CORPORATION, Framingham, MA (US)

(72) Inventor: Matthew E. Neutra, Sherborn, MA (US)

(73) Assignee: BOSE CORPORATION, Framingham, MA (US)

( * ) Notice: Subject to any disclaimer, the term of this patent is extended or adjusted under 35 U.S.C. 154(b) by 235 days.

(21) Appl. No.: 16/014,246

(22) Filed: Jun. 21, 2018

(65) Prior Publication Data

US 2019/0391733 A1 Dec. 26, 2019

(51) Int. Cl.
*G06F 3/048* (2013.01)
*G06F 3/0484* (2013.01)
*H05B 47/155* (2020.01)
*G06F 16/40* (2019.01)
(Continued)

(52) U.S. Cl.
CPC .......... *G06F 3/04847* (2013.01); *G06F 3/048* (2013.01); *G06F 3/0484* (2013.01); *G06F 3/04845* (2013.01); *G06F 16/40* (2019.01); *G06F 16/4393* (2019.01);
(Continued)

(58) Field of Classification Search
CPC ...... G06F 16/40; G06F 16/4393; G06F 3/048; G06F 3/04841; G06F 3/0484; G06F 3/04847; G06F 3/04842; G06F 3/04845; G06F 3/0489; H05B 37/029; H05B 47/155; G09G 2320/0626
See application file for complete search history.

(56) References Cited

U.S. PATENT DOCUMENTS 3,763,394 A * 10/1973 Blanchard ............ H05B 47/155
                                                    315/294
4,095,139 A *  6/1978 Symonds ............. H05B 47/155
                                                    315/153
(Continued)

OTHER PUBLICATIONS

BEYOND Version 2.0, build 620 (BEYOND Manual, of the Beyond software, p. 1-396 pages, copyrighted 2014 + Screenshots of the video tutorial"BEYOND Laser Show Tutorial—Timeline Foundations", dated Jan. 30, 2015, 26 Screenshots) 422 pages total.*
(Continued)

*Primary Examiner* — William L Bashore
*Assistant Examiner* — David Faber
(74) *Attorney, Agent, or Firm* — Patterson + Sheridan, LLP (57) ABSTRACT

A graphical user interface (GUI) is provided for configuring timed events synchronized with recorded media. The GUI includes a plurality of fader bars representing a light intensity of corresponding light channels and a media pane representing a timed progression of a selected piece of media. A set of time stamps are created in the media pane, each time stamp configuring at least one timed event synchronized with a corresponding time instant of the recorded media, wherein the time stamp is represented by a visual element within the media pane. At least one timed event configured by the time stamp includes triggering of at least one of the set of light channels at the corresponding time instant of the recorded media at a configured light intensity, wherein a corresponding fader bar displays the configured light intensity.

19 Claims, 5 Drawing Sheets

(51) Int. Cl.
*G06F 16/438* (2019.01)
*G06F 3/0489* (2013.01)

(52) U.S. Cl.
CPC ......... *H05B 47/155* (2020.01); *G06F 3/0489* (2013.01); *G06F 3/04842* (2013.01); *G09G 2320/0626* (2013.01)

(56) References Cited

U.S. PATENT DOCUMENTS

| | | | | |
|---|---|---|---|---|
| 6,411,289 | B1* | 6/2002 | Zimmerman | G09B 15/00 345/419 |
| 6,622,053 | B1* | 9/2003 | Hewlett | G02B 26/0841 700/19 |
| 7,228,190 | B2* | 6/2007 | Dowling | H05B 47/12 700/94 |
| 7,449,847 | B2* | 11/2008 | Schanberger | G09G 3/2014 315/312 |
| 9,743,010 | B1* | 8/2017 | Edwards | H04N 5/2357 |
| 10,735,668 | B2* | 8/2020 | Edwards | H04N 5/2357 |
| 2002/0038157 | A1* | 3/2002 | Dowling | A63J 17/00 700/90 |
| 2003/0132722 | A1* | 7/2003 | Chansky | H05B 47/155 315/292 |
| 2004/0150752 | A1* | 8/2004 | Iwase | H04N 9/76 348/584 |
| 2005/0077843 | A1* | 4/2005 | Benditt | H05B 47/155 315/312 |
| 2005/0200318 | A1* | 9/2005 | Hunt | H05B 47/155 315/316 |
| 2006/0103333 | A1* | 5/2006 | Toms | H05B 47/155 315/312 |
| 2006/0158461 | A1* | 7/2006 | Reese | G06T 1/20 345/620 |
| 2009/0196128 | A1* | 8/2009 | Lille | G11B 5/4866 369/13.32 |
| 2011/0115413 | A1* | 5/2011 | Erickson | H05B 47/155 315/312 |
| 2011/0169430 | A1* | 7/2011 | Kirkup | H05B 47/155 315/312 |
| 2014/0351733 | A1 | 11/2014 | Soheili | |
| 2016/0292955 | A1* | 10/2016 | Gronkowski | G07F 17/3269 |
| 2017/0156592 | A1* | 6/2017 | Fu | A61B 5/7221 |
| 2018/0158079 | A1* | 6/2018 | Chu | G06Q 30/0202 |
| 2020/0246080 | A1* | 8/2020 | Yang | G01N 21/4738 |

OTHER PUBLICATIONS

VenueMagic, "VenueMagic 2.6 Software Reference Manual", Jan. 2014, 313 pages. http://www.venuemagic.co.uk/web/wp-content/uploads/2014/01/VenueMagic-Manual-Version2-6.pdf.*

Electronic Theatre Controls, "element: Lighting Control Console User Manual Version 2.1.0", 2013, 318 pages https://www.etcconnect.com/workarea/downloadasset.aspx?id=10737461200.*

ENTTEC, "DMXIS Lighting Control System for Mac OS X and PC Windows User Manual—1.6", 2017, 42 pages https://usermanual.wiki/Enttec/DmxisManual.1191092167/view.*

Pathway Connectivity, "cognito User Guide Version 9.25.14", 2014, 64 pages.*

ETC, "Element Console Programming Level 1: Essentials V2.3.0 Rev. A", 2015, 40 pages.*

ETC, "Ion Operations Manual Version 2.7.0", May 2018, 625 pages.* qlcplus.org, "Q Light Controller+", Feb. 11, 2014, 10 pages https://www.qlcplus.org/featuretour.html.*

International Search Report and Written Opinion for International Application No. PCT/US2019/034098 dated Sep. 12, 2019, 13 pages.

Pangolin Laser Systems: "BEYOND TimeLine Editor" Dec. 31, 2014, Retrieved from the Internet: URL:https://pangolin.com/pages/manuals[retrieved on Sep. 4, 2019], 19 pages.

Pangolin Laser Systems: "BEYOND Channels : Using Channels in BEYOND", Dec. 31, 2014, Retrieved from the Internet:URL:https://pangolin.com/pages/manuals [retrieved on Sep. 4, 2019], 6 pages.

Pangolin Laser Systems: "BEYOND Laser Show Tutorial—Timeline Foundations", YouTube, Jan. 30, 2015, pp. 1-3, Retrieved from the Internet: URL:https://www.youtube.com/watch?v=vJrxj9VURbM [retrieved on Sep. 5, 2019].

Chromateq: "Pro DMX Software, Stage Lighting, Entertainment Lighting Control, Audio and Video Timeline", Dec. 5, 2017, Retrieved from the Internet: URL:https://web.archive.org/web/20171205000743/http:I/www.chromateq.com/64-chromateq-pro-dmx.htm [retrieved on Sep. 5, 2019], 5 pages.

Chromateq: "Pro DMX: User Manual How to Use Live Controls and Effects", Dec. 5, 2017, Retrieved from the Internet: URL:http:://www.chromateq.com/64-chromateq-pro-dmx.htm [retrieved on Sep. 5, 2019], 22 pages.

Chromateq: "Pro DMX : User Manual How to Use Scenes—How to Use Scenes 2", Dec. 5, 2017, Retrieved from the Internet: URL:http://www.chromateq.com/64-chromateq-pro-dmx.htm [retrieved on Sep. 5, 2019], 20 pages.

Chromateq: "Pro DMX: Manuel Utilisateur Comment Utiliser LA Timeline", Dec. 5, 2017, Retrieved from the Internet: URL:http:://www.chromateq.com/64-chromateq-pro-dmx.htm [retrieved on Sep. 5, 2019] (French version is 15 pages, the English translation is 13 pages; total 28 pages ).

* cited by examiner

SYNCHRONIZING TIMED EVENTS WITH MEDIA

FIELD

Aspects of the disclosure generally relate to synchronizing timed events with media, and more specifically to a software tool for synchronizing timed events with recorded media.

BACKGROUND

Several entertainment related applications routinely include synchronizing lighting and other effects with recorded media such as audio and video. These applications include theatrical shows, concerts, sporting events and demonstrations of entertainment related equipment in stores. For example, a display module at a store may be configured to play a video on a display screen of a display module upon a customer trigger, and a number of pre-programmed timed events synchronized with the video may be triggered. These timed events may include turning on/off one or more lights, increasing/decreasing intensity of the lights, setting a volume of a corresponding audio to different levels, displaying text messages and so on at pre-programmed times during the video.

Digital Multiplex (DMX) is a standard protocol for digital communication networks that is commonly used to control lighting effects. Software interfaces currently available for programming lighting events including DMX lighting and other timed events synchronized with recorded media require tedious and time consuming programming of timed events. For example, a user manually enters a configuration for each timed event. There is no particular software tool currently available that is built for synchronizing timed lighting events with recorded media. Some complex theatrical systems are available where a computer running a complex piece of software controls several devices including lighting related devices. While these complex systems allow some form of synchronization with media, they require complex software code to be written and use multiple sub systems to execute the synchronized timed events. Thus, these systems are not suitable for applications that require relatively easy and fast configuration of synchronized timing events in a cost effective manner. There is a need for an intuitive software tool that allows efficient programming of timed events synchronized with recorded media.

SUMMARY

All examples and features motioned herein can be combined in any technically possible manner.

Aspects of the present disclosure provide a graphical user interface (GUI) for configuring timed events synchronized with recorded media. The GUI generally includes a plurality of fader bars, each fader bar corresponding to one of a set of light channels and wherein a length of each fader bar represents a light intensity of a corresponding light channel; and a media pane representing a timed progression of the recorded media over a lateral time axis, wherein each position on the lateral time axis represents a time instant during a given time duration of the recorded media, wherein each vertical position within the media pane represents a light intensity over a light intensity scale, wherein a set of time stamps can be created in the media pane, each time stamp configuring at least one timed event synchronized with a corresponding time instant of the recorded media, the at least one timed event to be triggered during a playback of the recorded media at the corresponding time instant, wherein the at least one timed event configured by the time stamp includes triggering of at least one of the set of light channels at the corresponding time instant of the recorded media at a configured light intensity, wherein the time stamp is represented by a visual element within the media pane, a lateral position of the visual element within the media pane representing the corresponding time instant of the recorded media, and a vertical position of the visual element within the media pane representing the configured light intensity of the at least one light channel configured for the time stamp, wherein the configured light intensity of the at least one light channel as represented by the visual element corresponds to a light intensity represented by a corresponding one of the fader bars for the at least one light channel.

In an aspect, positioning a pointer of an input device over the visual element of the time stamp triggers a text box in the vicinity of the visual element, the text box displaying information relating to the configured at least one timed event, the information including at least one of the configured at least one light channel, the configured light intensity for the at least one light channel, or the time instant of the recorded media at which the time stamp is configured.

In an aspect, the GUI further includes a play head that slides within the media pane along the lateral time axis, wherein a lateral position of the play head within the media pane represents a time instant during the recorded media. In an aspect, positioning the play head over the visual element of the time stamp visually activates the configured at least one light channel and sets a length of the corresponding one of the fader bars to the configured light intensity.

In an aspect, playing back the recorded media triggers the at least one timed event at the corresponding time instant of the configured time stamp, wherein the triggering includes a visual activation of the configured at least one light channel and displaying a length of the corresponding one of the fader bars to the configured light intensity.

In an aspect, a position of the visual element can be changed laterally within the media pane to change the time instant configured for the time stamp to a different time instant of the recorded media.

In an aspect, a position of the visual element can be changed vertically within the media pane to change the configured light intensity to a different configured light intensity.

In an aspect, the visual element is visually connected by a solid line to a second visual element positioned at a second time instant within the media pane, wherein the solid line represents a change of light intensity of at least one of the configured at least one light channel between the visual element and the second visual element.

In an aspect, the visual element is visually connected by a dotted line to a second visual element positioned at a second time instant within the media pane, wherein the dotted line represents no change of light intensity of the configured at least one light channel between the visual element and the second visual element.

In an aspect, the GUI further includes a mechanism to jump to a next visual element or previous visual element within the media pane.

Aspects of the present disclosure provide a method for operating a graphical user interface (GUI) for configuring timed events synchronized with recorded media. The method generally includes importing the recorded media into the GUI, wherein a media window in the GUI visually represents and allows playback of the recorded media, wherein a media pane in the GUI represents a timed progression of the recorded media over a lateral time axis, wherein each position on the time axis represents a time instant during a given time duration of the recorded media; and creating a set of time stamps in the media pane, each time stamp configuring at least one timed event synchronized with a corresponding time instant of the recorded media, the at least one timed event to be triggered during a playback of the recorded media at the corresponding time instant, wherein the at least one timed event includes triggering of at least one of the set of light channels at the corresponding time instant of the recorded media at a configured light intensity, wherein the time stamp is visually represented by a visual element within the media pane, a lateral position of the visual element within the media pane representing the corresponding time instant of the recorded media, and a vertical position of the visual element within the media pane representing the configured light intensity of the at least one light channel configured for the time stamp. Creating the time stamp generally includes selecting the corresponding time instant of the recorded media within the media pane for creation of the time stamp; and creating the visual element representing the time stamp at the selected corresponding time instant by associating the at least one light channel and the configured light intensity with the corresponding time instant.

In an aspect, selecting the corresponding time instant includes positioning a play head over the corresponding time instant in the media pane, wherein the play head slides within the media pane along the lateral time axis, wherein a lateral position of the play head within the media pane represents a time instant during the recorded media.

In an aspect, creating the visual element representing the time stamp includes activating the at least one light channel; creating the visual element for the activated at least one light channel in the media pane at the selected corresponding time instant at a default light intensity; and changing a position of the created visual element vertically within the media pane to set the light intensity of the at least one light channel to the configured light intensity.

In an aspect, creating the visual element for the activated at least one light channel includes at least one of selecting a button on the GUI, depressing a key on a input keyboard, simultaneously depressing a combination of keys on the input keyboard or a combination of depressing a key on the input keyboard and selecting a button on the GUI.

In an aspect, when the at least one light channel includes only one of the set of light channels, creating the visual element for the activated one of the light channels includes setting the configured light intensity for the activated one of the light channels on a corresponding fader bar on the GUI, wherein a length of the fader bar represents the light intensity of a the light channel.

In an aspect, the method further includes changing the configured light intensity for the time stamp by selecting a length of a corresponding fader bar on the GUI, wherein a length of the fader bar represents the light intensity of a the light channel.

In an aspect, the method further includes changing the time instant configured for the time stamp to a different time instant of the recorded media by changing a lateral position of the visual element in the media pane.

In an aspect, the method further includes changing the configured light intensity to a different configured light intensity by changing a vertical position of the visual element in the media pane.

Aspects of the present disclosure provide a graphical user interface (GUI) for configuring timed events synchronized with recorded media. The GUI generally includes a plurality of fader bars, each fader bar corresponding to one of a set of light channels and wherein a length of each fader bar represents a light intensity of a corresponding light channel; and a media pane representing a timed progression of the recorded media over a lateral time axis, wherein each position on the lateral time axis represents a time instant during a given time duration of the recorded media, wherein each vertical position within the media pane represents a light intensity over a light intensity scale. The media pane generally includes a play head that slides within the media pane along the lateral time axis, wherein a lateral position of the play head within the media pane represents a time instant during the recorded media, wherein a set of time stamps can be created in the media pane, each time stamp configuring at least one timed event synchronized with a corresponding time instant of the recorded media, the at least one timed event to be triggered during a playback of the recorded media at the corresponding time instant, wherein the at least one timed event configured by the time stamp includes triggering of at least one of the set of light channels at the corresponding time instant of the recorded media at a configured light intensity, wherein the time stamp is visually represented by a visual element within the media pane, a lateral position of the visual element within the media pane representing the corresponding time instant of the recorded media, and a vertical position of the visual element within the media pane representing the configured light intensity of the at least one light channel configured for the time stamp, wherein the configured light intensity of the at least one light channel as represented by the visual element corresponds to a light intensity represented by a corresponding one of the fader bars for the at least one light channel; and a timed event window for configuring one or more additional timed events for the time stamp, the additional timed events include triggering at least one additional light channel, transmitting a serial command or transmitting a network command.

In an aspect, positioning the play head over the visual element of the time stamp visually activates the configured at least one light channel and sets a length of the corresponding one of the fader bars to the configured light intensity.

In an aspect, playing back the recorded media triggers the at least one timed event at the corresponding time instant of the configured time stamp, wherein the triggering includes a visual activation of the configured at least one light channel and setting a length of the corresponding one of the fader bars to the configured light intensity.

DETAILED DESCRIPTION

Aspects of the present disclosure describe a software tool that allows a user to synchronize lighting effects and other timed events (e.g., transmitting a serial command or transmitting a network command) with recorded media in a relatively quick and cost effective manner.

Figure 1:
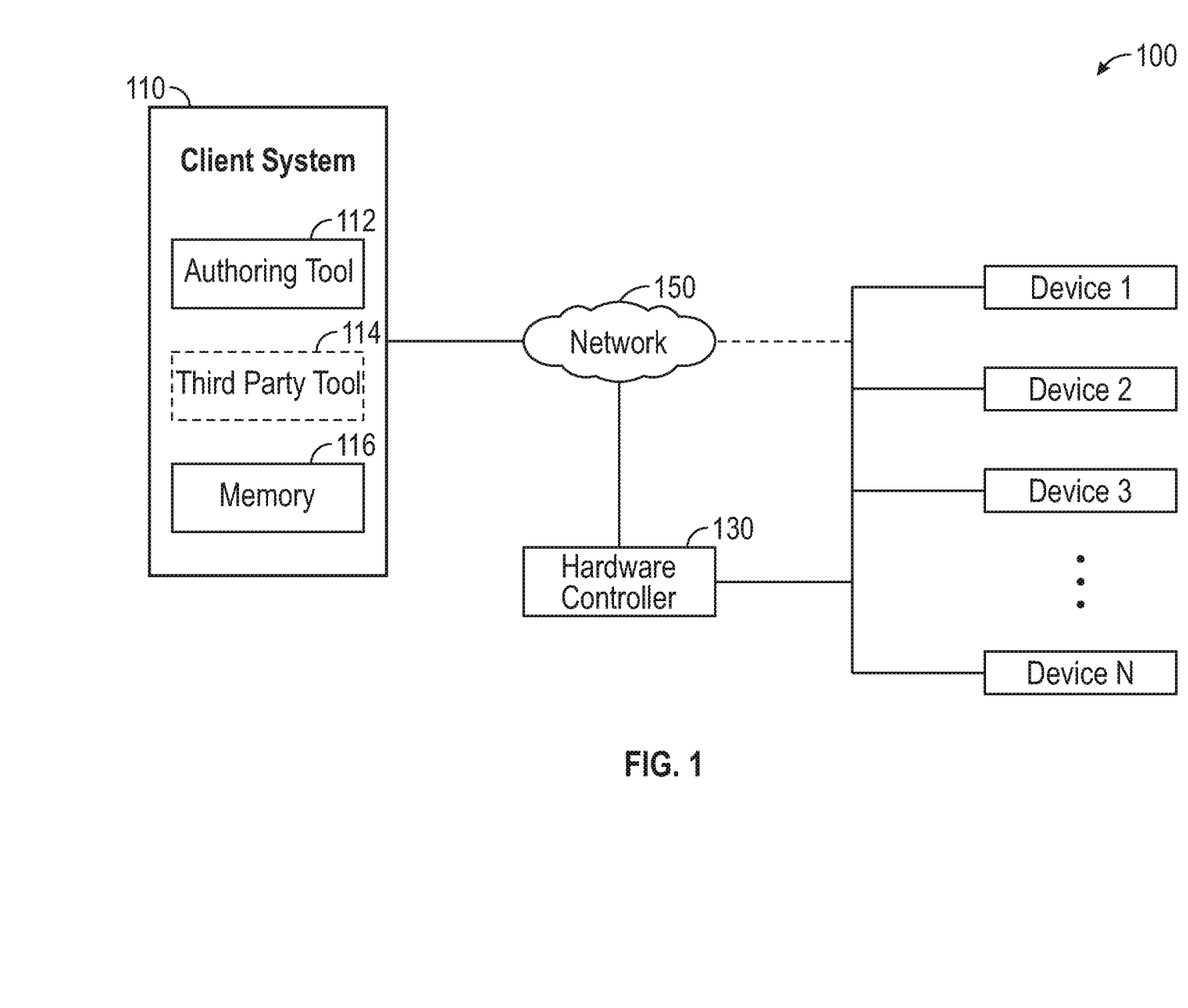
FIG. 1 illustrates a computing environment for configuring and implementing timed events synchronized with recorded media, in accordance with certain aspects of the present disclosure.

FIG. 1 illustrates a computing environment 100 for configuring and implementing timed events synchronized with recorded media, in accordance with certain aspects of the present disclosure.

The computing environment 100 includes a client system 110 and a hardware controller 130, each connected to a network 150. The network 150, in general, may be a wide area network (WAN), local area network (LAN), wireless LAN (WLAN), personal area network (PAN), a cellular network, or any other network implementing a technology that allows devices to communicate electronically with other devices. In a particular aspect, the network 150 is the Internet.

Client system 110 is included to be representative of a general purpose computing system hosting software applications that may be installed and run locally on the client device. The client system 110 may include mobile computing systems including smart phones, tablet computers, laptop computers, or any other mobile computing devices or systems capable of running software applications, and communicating over a network (e.g., the internet). In an aspect, client system 110 includes non-mobile computing devices such as desktop computers or other non-mobile computing devices capable of capturing images and communicating over a network (e.g., the internet)

As shown, the computing environment 100 further includes a set of devices, Device 1 to Device N, connected to a hardware controller 130 directly or via the network. In an aspect, the hardware controller 130 is a device that supports multiple network protocols, accepts instructions, and controls a plurality of devices supporting different protocols based on the instructions. For example, the hardware controller includes a digital signage player from BrightSign®. The Devices 1-N may include lighting consoles supporting DMX lighting channels, devices supporting other lighting protocols, devices that accept serial commands, or devices that accept network commands.

The client system 110 includes an authoring tool 112 according to aspects of the present disclosure. The authoring tool 112 provides a GUI that allows a user to synchronize lighting effects and other timed events with recorded media in a relatively quick and cost effective manner. Aspects of the GUI are described in detail by the following description. Memory 116 stores pieces of media (e.g., audio or video files) that may be imported into the GUI for synchronizing timed events. The memory 116 also stores timed event configurations associated with a piece of media. In an aspect, a user imports a piece of media into the GUI of the authoring tool 112 and configures one or more timed events synchronized with the selected piece of media. The user may save the configurations into the memory 116 and transmit the configurations along with the associated piece of media to the hardware controller 130 via the network 150. The hardware controller 130 instructs one or more of the Devices 1-N based on the received configurations. For example, the user synchronizes one or more lighting events with a piece of video and conveys the configurations to the hardware controller 130. The hardware controller, based on the received configurations, plays the video on a connected display device and triggers lighting effects at configured time instants by controlling a lighting console device or by directly controlling lighting channels.

In an aspect, the authoring tool exports one or more timed events configurations generated using its GUI to a third party tool 114 that is specifically designed to communicate with the hardware controller. The third party tool 114 receives the configurations and communicates the configurations to the compatible hardware controller 130. In an aspect, the third party tool 114 is a proprietary tool for communicating with the hardware controller. For example, the third party controller may be the Bright Author tool for BrightSign® digital signage players.

In an aspect, while the computing environment 100 is shown to include one hardware controller 130, the computing environment 100 may include a plurality of hardware controllers 130. The client system 110 may export the same set of timed event configurations to each of the plurality of hardware controllers 130. Each hardware controller reproduces the same sequence of configured lighting effects and other timed events based on the exported configuration. In an aspect, this allows a single user operating a respective client system 110 to reproduce synchronized media lighting and other events in thousands of retail display systems by remotely controlling hardware controllers 130 at the retail locations via the network 150. This allows massively scalable deployments of synchronized media experiences at very low costs.

Figure 2:
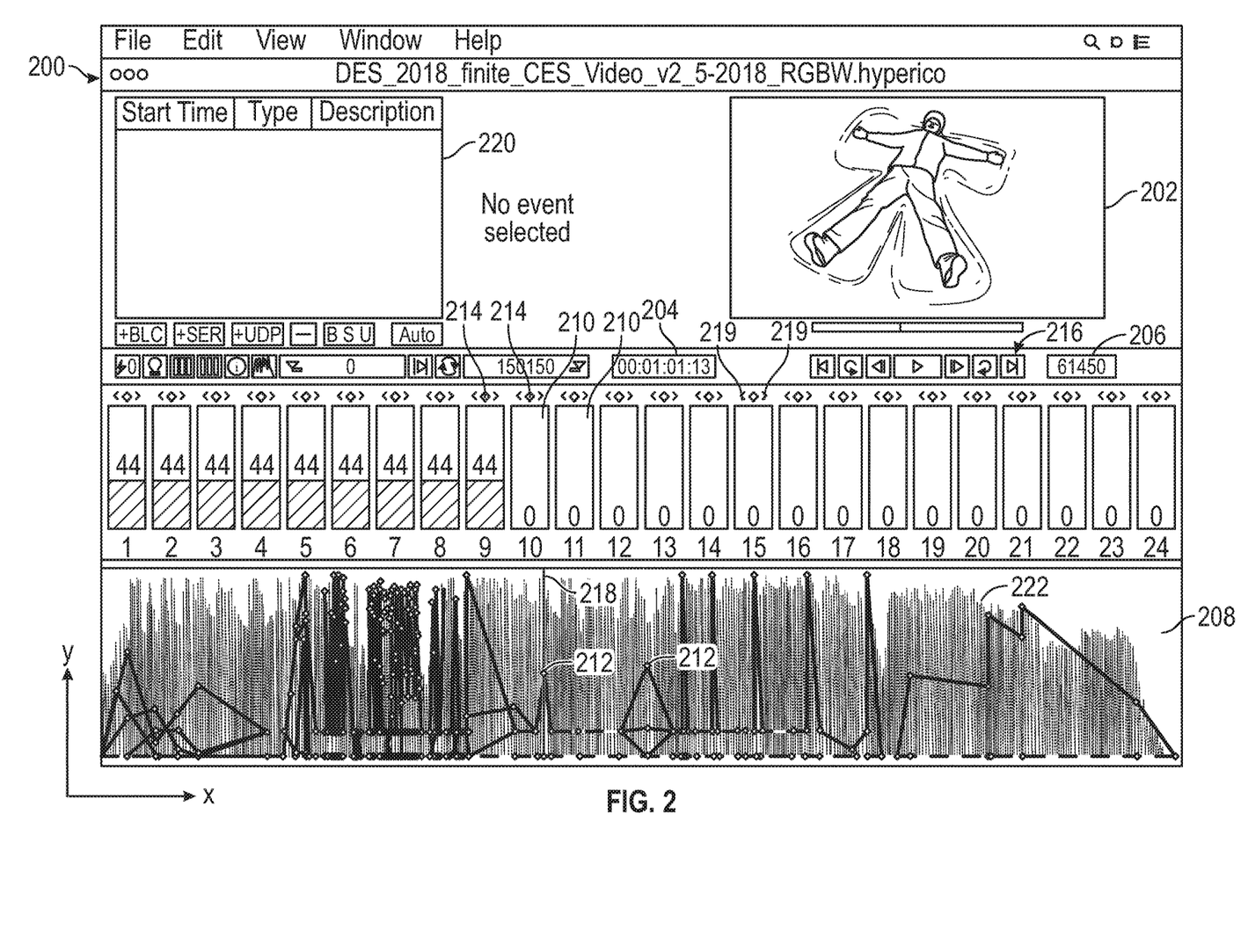
FIG. 2 illustrates a graphical user interface (GUI) for configuring timed events synchronized with recorded media, in accordance with certain aspects of the present disclosure.

FIG. 2 illustrates a GUI 200 for configuring timed events to be synchronized with recorded media, in accordance with certain aspects of the present disclosure As shown in FIG. 2, the GUI 200 includes a media window 202 that allows playback of a piece of media currently selected by the user for synchronizing timed events. In an aspect, the piece of media includes a video file or an audio file. In an aspect, the GUI 200 allows the piece of media to be imported into the GUI (e.g., from a local storage device) and displays the imported piece of media in the media window 202. As shown, the GUI 200 provides a set of controls 216 to control the playback of the media. The set of controls 216 includes, but is not limited to, a button to playback the media, buttons for frame by frame progression (forward and reverse progression), slow motion play (forward and reverse play) etc.

A media pane 208 represents a timed progression of the selected recorded media over a lateral time axis shown as the x-axis. Each position on the lateral time axis represents a time instant during a given time duration of the recorded media.

A play head 218 is provided in the media pane 208 that slides within the media pane 208 along the lateral time axis. A lateral position of the play head 218 within the media pane 208 represents a time instant during the recorded media currently being accessed. The position of the play head 218 within the media pane 208 is synchronous with the time instant of the recorded media being represented in the media window 202. In an aspect, a frame counter 204 displays information relating to the position of the play head 218 within the media pane 208. As shown, this information of the frame counter 204 includes, from the left, hours, minutes, seconds, and the particular frame number currently being selected by the play head 218. A millisecond counter 206 shows the position of the play head 218 within the media pane in milliseconds.

A plurality of fader bars 210 are provided, each fader bar 210 corresponding to one of a set of light channels. In an aspect, each light channel corresponds to a different DMX light channel. As shown, each fader bar 210 is identified by a corresponding numerical index of the DMX light channel, as shown in a bottom region of each fader bar 210. In an aspect, each fader bar 210 visually represents a light intensity of a corresponding light channel via a length of the fader bar, a shorter length representing a lower light intensity and a longer length representing a higher light intensity.

In certain aspects, a set of time stamps may be created in the media pane 208, each time stamp configuring at least one timed event synchronized with a corresponding time instant of the recorded media. In an aspect, each configured timed event is to be triggered during a playback of the recorded media at a corresponding time instant.

In an aspect, each time stamp is visually represented by a visual element 212 within the media pane 208. A lateral position (e.g., a position along the x-axis) of the visual element 212 within the media pane represents a corresponding time instant of the recorded media at which the time stamp is created. In an aspect, the lateral time axis of the media pane 208 may be enlarged or reduced in size to show less or more time period respectively of the media within the media pane window for easy management. For example, the time axis may be enlarged when there is a dense distribution of visual elements 212 in a short time period for easy selection and manipulation of the visual elements 212. It may be noted that the terms 'time stamp' and 'visual element' are interchangeably used in this disclosure.

In an aspect, a time stamp (e.g., represented by a corresponding visual element 212 in the media pane 208) at a given time instant of the recorded media may configure a set of DMX light channels to be triggered at the time instant at a configured light intensity, for example, during playback of the recorded media. In an aspect, each position on a vertical y-axis within the media pane 208 represents a light intensity over a light intensity scale. In an aspect, the light intensity scale is from 0 points to 100 points, 0 points representing a turned off state and 100 points being the maximum light intensity. Thus, a vertical position of the visual element (e.g., a position along the y-axis) within the media pane 208 represents a configured light intensity of the set of DMX light channels configured for the time stamp. In an aspect, every light channel in a set of light channels configured by a particular time stamp is configured at the same light intensity. In an aspect, multiple time stamps may be created at a same time instant of the recorded media, each time stamp configuring a different set of DMX light channels at a different corresponding light intensity.

In an aspect, a configured light intensity of a set of light channels as represented by a vertical position of a visual element 212 within the media pane 208 corresponds to a light intensity represented by each fader bar 210 corresponding to each of the light channels in the set. For example, if the light intensity for a set of DMX light channels configured for a particular visual element 212 is set to 50 pts (e.g., by setting a vertical position of the visual element) within the media pane 208, fader bars 210 corresponding to the light channel in the set are automatically set to 50 pts.

A vertical position of an already configured visual element 212 (e.g., along the y-axis) may be adjusted to adjust the light intensity of DMX channels configured for the visual element 212. A lateral position of an already configured visual element 212 (e.g., along the x-axis) may be adjusted to adjust the time instant at which the configurations are to trigger. In an aspect, the GUI 200 may provide one or more mechanisms for changing a position of a visual element 212 within the media pane 208. For example, a position of the visual element 212 may be adjusted by selecting the visual element 212, for example, with an input device (e.g., a mouse, touch screen, stylus pen etc.) and dragging the visual element 212 to a different position within the media pane 208. Other known mechanisms for changing a position of an element within an interface may be envisioned and implemented by the GUI 200.

Figure 2A:
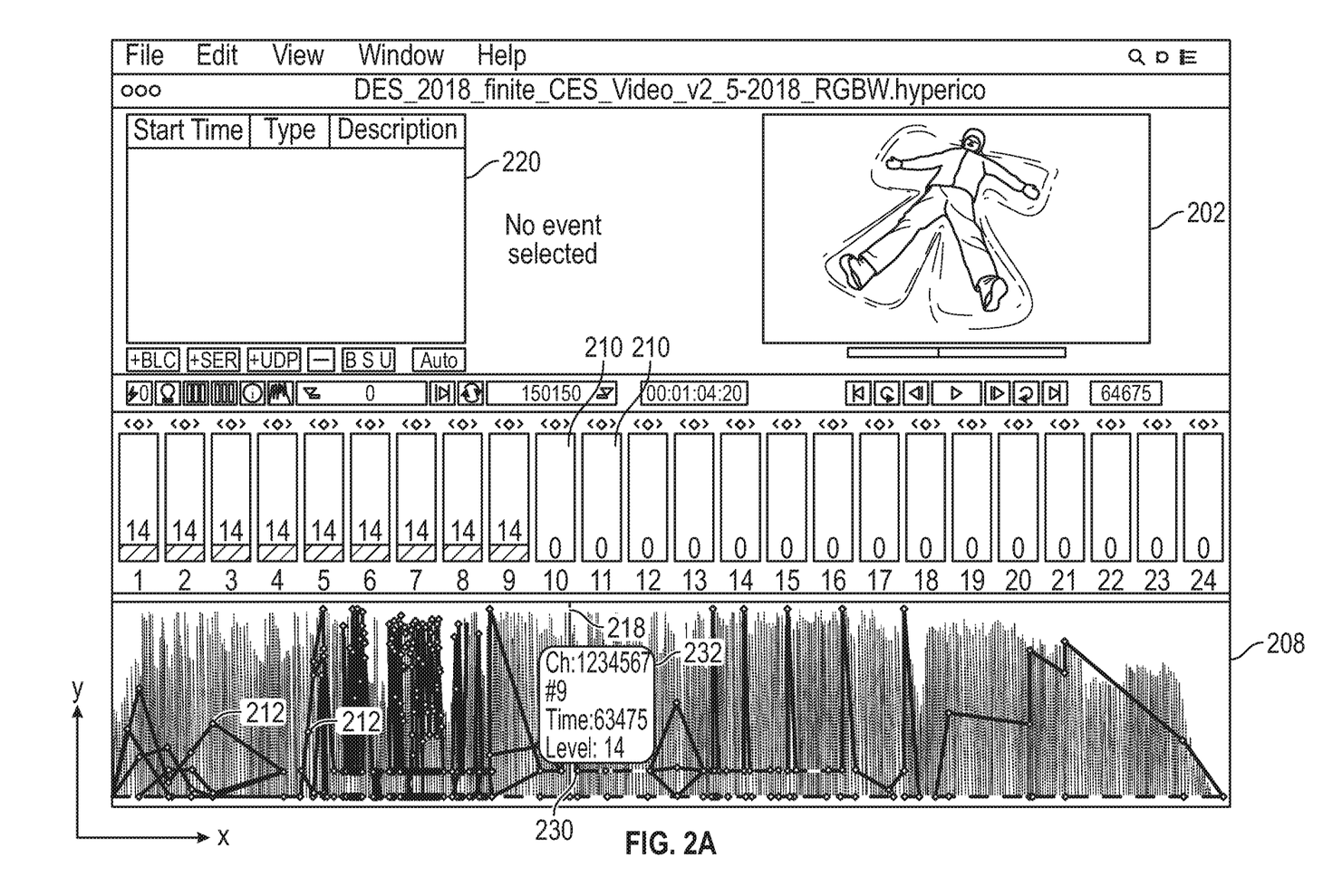
FIG. 2A illustrates additional features of the GUI for configuring timed events synchronized with recorded media, in accordance with certain aspects of the present disclosure

In an aspect, positioning a pointer of an input device (e.g., mouse, finger or stylus pen on a touch pad) over a visual element 212 triggers a text box to be displayed in the vicinity of the visual element, the text box displaying information relating to a corresponding configured timed event. For example, the information includes at least one of the configured set of light channels, the configured light intensity for the set of light channels, or the time instant of the recorded media at which the time stamp is configured. As shown in FIG. 2A, positioning a mouse pointer over the visual element 230 causes text box 232 to be displayed in the vicinity of the selected visual element 230. As shown in FIG. 2A, the configuration information displayed in the text box 232 includes light channels 1-9 configured for the visual element, the time instant of 62475 milliseconds at which the visual element is configured, and the light intensity of 14 points configured for the light channels.

In an aspect, positioning the play head 218 over a visual element visually activates the set of light channels configured for the visual element 230, and sets a length of the corresponding one of the fader bars 210 to the corresponding configured light intensity. The visual activation of the set of channels may be as simple as brightening the fader bars 210 for the configured light channels 1-9, changing their color or other commonly known means for visually highlighting a region of an interface. As shown in FIG. 2A fader bars for each of the configured light channels 1-9 of the selected visual element 230 are set to 14 points light intensity.

In an aspect, a particular visual element 212 is selected by positioning a pointer of a pointing device (e.g., a computer mouse) over the visual element 212 and depressing a selection button on the input device. Once the visual element 212 is selected, fader bars corresponding to the set of light channels configured for the visual element 212 are visually activated and display the light intensity set for the visual element 212. In an aspect, the front and back arrows 219 provided over each fader bar may be used to jump to the next or previous visual element respectively within the media pane 208. For example, after selecting a particular visual element, the user selects the front or back arrows 219 over each fader bar configured for the visual element 212 to jump to the next or previous visual element 212 respectively.

In certain aspects, two visual elements 212 within the media pane are connected by a solid line or a dotted line if the connected visual elements 212 have at least one common configured light channel.

In certain aspects, as shown in the figure, certain visual elements 212 are visually connected by a solid line to certain other visual elements 212 positioned at a different time instant within the media pane 208. In an aspect, the solid line represents a change of light intensity of at least one of the configured set of light channel between the connected visual elements 212. For example, a first visual element configuring light channels 6, 7, 8 and 9 at 50 points light intensity may be connected by a solid line to another visual element configuring light channels 9 and 11 at 75 points light intensity.

In certain aspects, as shown in the figure, certain visual elements 212 are visually connected by a dotted line to certain other visual elements 212 positioned at a different time instant within the media pane 208. In an aspect, the dotted line represents no change of light intensity of one or more of the configured light channels between the visual elements 212. For example, a first visual element configuring light channels 6, 7, 8 and 9 at 50 points light intensity may be connected by a dotted line to another visual element configuring light channels 9 and 11 at the same 50 points light intensity.

In an aspect, the light intensity of a particular light channel is interpolated between consecutive visual elements 212 configuring the light channel and the speed with which the light intensity of the light channel changes is dictated by the time duration between the visual elements 212.

Figure 3:
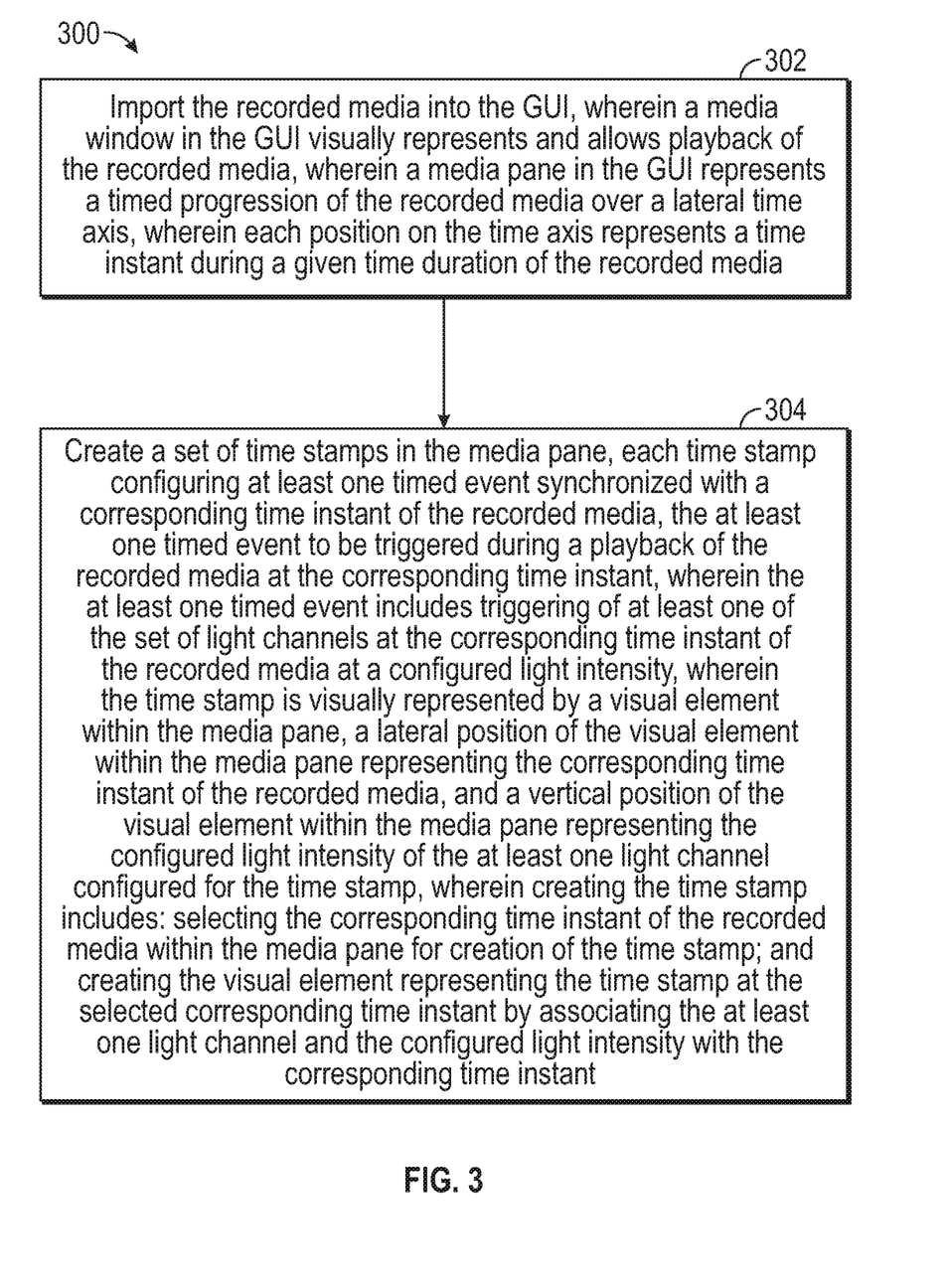
FIG. 3 illustrates example operations for operating a GUI for configuring timed lighting events synchronized with recorded media.

FIG. 3 illustrates example operations 300 for operating a graphical user interface (GUI) for configuring timed lighting events synchronized with recorded media.

Operations 300 begin, at 302, by importing the recorded media into the GUI. In an aspect, a media window in the GUI visually represents and allows playback of the recorded media. A media pane in the GUI represents a timed progression of the recorded media over a lateral time axis, where each position on the time axis represents a time instant during a given time duration of the recorded media.

At 304, a set of time stamps is created in the media pane. Each time stamp configures at least one timed event synchronized with a corresponding time instant of the recorded media, the at least one timed event to be triggered during a playback of the recorded media at the corresponding time instant. The at least one timed event includes triggering of at least one of the set of light channels at the corresponding time instant of the recorded media at a configured light intensity. The time stamp is visually represented by a visual element within the media pane, a lateral position of the visual element within the media pane representing the corresponding time instant of the recorded media, and a vertical position of the visual element within the media pane representing the configured light intensity of the at least one light channel configured for the time stamp.

In an aspect, creating the time stamp includes selecting the corresponding time instant of the recorded media within the media pane for creation of the time stamp and creating the visual element representing the time stamp at the selected corresponding time instant by associating the at least one light channel and the configured light intensity with the corresponding time instant.

In certain aspects, to create a time stamp at a desired time instant of a currently selected recorded media (e.g., media displayed in the media window), the user first selects the time instant in the media pane 208. The user selects the desired time instant of the media by positioning the play head 218 at the desired time instant within the media pane 208. For example, the user positions the play head 218 at the desired time instant by positioning a pointer of an input device (e.g., a computer mouse) and by clicking a button on the input device to move the play head 218 to the position of the pointer within the media pane 208. Since the media window 202 visually displays the point in time selected by the play head 218 in the media pane 208, the user may listen and/or view the content at the selected time instant and adjust the play head 218 to move it to the desired time instant. The user may also confirm the selected time instant from the frame counter 204 or the millisecond counter 206. Once the desired time instant is selected, the user selects the set of DMX light channels the user desires to configure for the selected time instant. In an aspect, the user may select a particular light channel by positioning a pointer of a pointing device (e.g., a computer mouse) on the corresponding channel index and by selecting the index. The user may select multiple channel indices quickly by holding down a button on a keyboard (e.g., CTRL or SHIFT button) and select the corresponding channel indices one by one until all desired channels are selected. The user may also hold down a selection button of the pointing device and drag the pointer over each channel index to be selected. In an aspect, selecting each light channel visual activates the light channel by brightening the corresponding fader bar, changing color of the fader bar or other commonly known means for visually highlighting a region of an interface.

After selecting the desired set of light channels, the user creates the time stamp for the selected set of light channels at the selected time instant. As shown, a button 214 is provided above each fader bar that is used to create a visual element 212 for a selected set of light channels at the selected time instant. The user creates the time stamp for all selected light channels by selecting any one button 214 of a selected light channel. The GUI 200 may provide other means for creating the time stamp. For example, additionally or alternatively, the GUI 200 provides a single button that the user may select to create a time stamp of a set of selected light channels. In another example, the user depresses a key or a combination of keys on a keyboard to create the time stamp. Other known mechanisms may be envisioned for selecting the set of light channels and creating the time stamp.

In an aspect, creating the time stamp (e.g., by selecting the button) causes a corresponding visual element 212 to appear in the media pane 208 at the selected time instant. In an aspect, the created visual element 212 is associated with the selected set of light channels which may be confirmed by positioning the pointer of the pointing device over the created visual element to show a corresponding text box (e.g., text box 232) and confirming the light channels associated with the visual element from configuration information displayed in the text box. In an aspect, the visual element 212 is created at a default light intensity represented by a vertical position of the visual element 212 within the media pane 208. Once the visual element 212 is created, the light intensity of the configured set of light channels may be changed from the default light intensity to a desired light intensity by moving the visual element 212 vertically within the media pane 208. In an aspect, the time instant associated with the visual element 212 may be changed by moving the visual element 212 laterally to a different desired time instant. In an aspect, changing the light intensity and/or time instance associated with a particular visual element 212 does not change the set of light channels configured for the visual element 212.

In an aspect, a time stamp for configuring an individual light channel may be created by positioning the play head 218 to a desired time instant, and setting the light intensity of the desired light channel. The act of setting the light intensity of the light channel creates the time stamp at the selected time instant and causes a corresponding visual element 212 to be displayed at the selected time instant. In an aspect, the light intensity of an individual light channel is set by manually entering a desired light intensity value (e.g., between 0-100) within a corresponding fader bar 210 or by selecting a length of the fader bar 210 to the desired light intensity value (e.g., by positioning the pointer to the desired intensity within the fader bar 210 and selecting the position by clicking a selection button on the pointing device).

In an aspect, if the user desires to set a different light intensity for one of the set of light channels configured for the visual element 212 at the same time instant, the user moves the play head to the position of the visual element 212 and manually sets a desired light intensity value in a fader bar of the light channel. In an aspect, setting a different light intensity for one light channel from the set of light channels of the visual element 212 at the same time instant de-associates the light channel from the visual element 212 and creates a new visual element 212 for the light channel at the same time instant at the manually set light intensity.

In an aspect, if a user attempts to create a new visual element 212 for one or more light channels at a particular time instant at a given light intensity, and another visual element is already present at the same time instant and at the same given light intensity for one or more other channels, the newly configured light channels are added to the existing visual element's configuration. Further, if two separate visual elements 212 exist at a the same time instant but at different light intensities, changing the light intensity of either one of the visual elements to the other visual element's light intensity merges the two visual elements (and their corresponding configurations) into a single visual element.

In an aspect, the GUI 200 allows the user to view all those visual elements 212 that configure an individual light channel. For example, the user selects the individual light channel and depresses a configured combination of keys on a keyboard to display only those visual elements 212 that at least configure the selected light channel. Similarly, the user may view only those visual elements 212 that configure at least a set of selected light channels. For example, the user selects the set of light channels and depresses the configured combination of keys on the keyboard to display only those visual elements 212 that at least configure the selected set of light channels.

In an aspect, the media pane 208 shows an audio waveform 222 of the currently loaded piece of media. The user may use the audio waveform 222 as a guide for setting light intensities of configured light events. For example, the user may configure light intensities of one or more light channels to rise and fall with an amplitude of the audio waveform 222.

In an aspect, playing back the recorded media triggers each configured timed event at a corresponding configured time instant during the playback. For example, during playback, as the play head 218 passes over each visual element 212, the configured timed event at that visual element is triggered and visually displayed in the GUI 200. In an aspect, the triggering of a timed event during playback includes a visual activation of the configured light channels (e.g., visual activation of the corresponding fader bars) and displaying of a corresponding configured light intensity by automatically setting a length of the corresponding one or more fader bars 210 to the configured light intensity. This allows the user to monitor and check the time stamp configurations in real time and adjust the configurations as needed. In an aspect, the user may position the play head 218 at any time instant during the recorded media and play the media starting from that time instant to view the timed events configured after that time instant.

In an aspect, GUI 200 allows real time control of one or more devices connected to a client system 110 running the GUI 200, according to configurations generated using the GUI 200. This allows a user to test the configurations in a test environment or production environment in real time. For example, a set of lights may be connected to the client system 110 and may be configured (e.g., via the interface 200) to be controlled using the DMX light channels. During playback of the recorded media, as the play head 218 passes over each visual element 212 and a corresponding DMX lighting timed event is triggered, the lights connected to the client system 110 are fired based on the configuration. This allows a user to visually inspect the configured lighting effects in real time and adjust the lighting configurations as needed.

In an aspect, the window 220 in the top left region of the GUI 200 provides additional types of timed events (e.g., other than DMX lighting events) that may be synchronized with the selected piece of media displayed in the media window 202. These additional types of timed events include but are not limited to non-DMX lighting events, serial commands for devices that accept serial commands and network commands for devices that accept network commands. Each of these additional timed events may be created by positioning the play head 218 at a desired time instant and configuring the timed event.

In an aspect, the programmed timed events are exported directly to the hardware controller (130) where the playback of the same piece of recorded media and the configured lighting effects and other timed events are reproduced exactly as they are during playback of the recorded media in the GUI 200.

Figure 4:
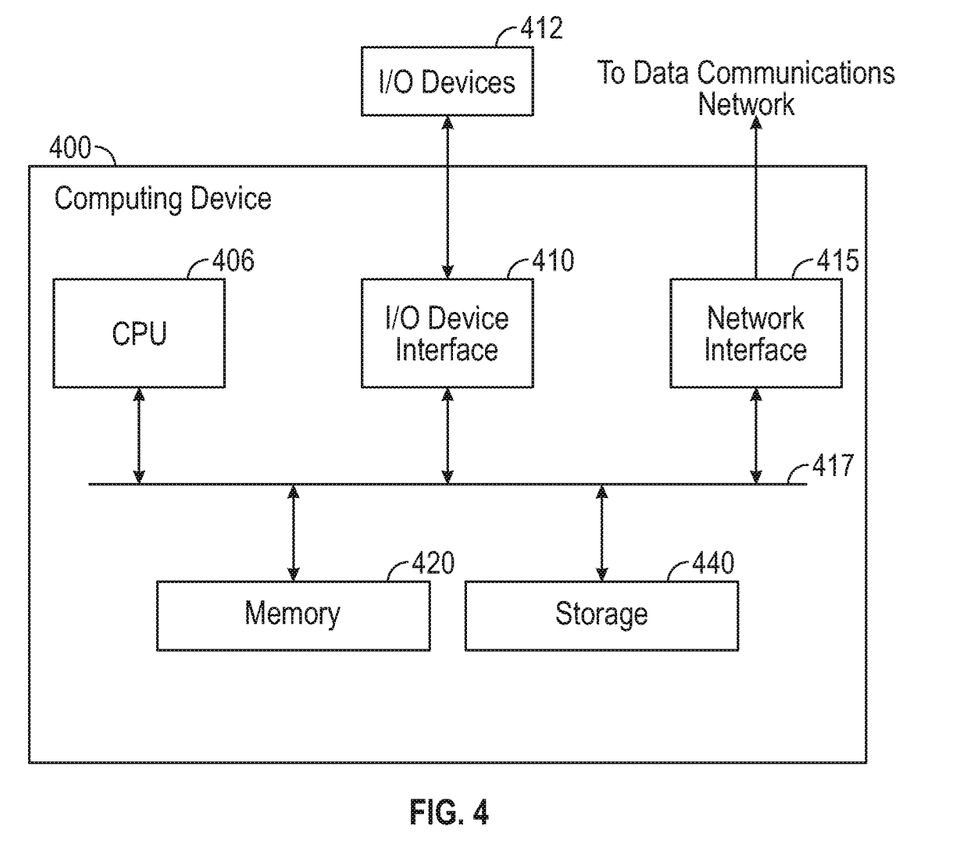
FIG. 4 illustrates an example computing system used to configure timed events synchronized with recorded media, in accordance with certain aspects of the present disclosure.

FIG. 4 illustrates an example computing system 400 used to configure timed events synchronized with recorded media, in accordance with certain aspects of the present disclosure. In an aspect, the computing system 400 is used to process one or more steps related to configuring timed lighting events and other timed events as discussed with reference to FIGS. 2, 2A, and 3. In an aspect, the computing system 400 implements the client system 110 as shown in FIG. 1. As shown, the computing system 400 includes, without limitation, a central processing unit (CPU) 406, a network interface 415, a memory 420, and storage 440, each connected to a bus 417. The computing system 400 may also include an I/O device interface 410 connecting I/O devices 412 (e.g., keyboard, display, mouse devices, image capture devices, etc.) to the computing system 400. Further, the computing elements shown in computing system 400 may correspond to a physical computing system (e.g., a system in a data center), a physical computing system with one or more components being accessed via a network, or may be a virtual computing instance executing within a computing cloud.

The CPU 406 retrieves and executes programming instructions stored in the memory 420 as well as stored in the storage 440. The bus 417 is used to transmit programming instructions and application data between the CPU 406, I/O device interface 410, storage 440, network interface 415, and memory 420. It may be noted that CPU 406 is included to be representative of a single CPU, multiple CPUs, a single CPU having multiple processing cores, and the like, and the memory 440 is generally included to be representative of a random access memory or other volatile memory. The storage 440 may be a disk drive, or flash storage device, or other non-volatile memory device. Although shown as a single unit, the storage 440 may be a combination of fixed and/or removable storage devices, such as fixed disc drives, removable memory cards, optical storage, network attached storage (NAS), or a storage area-network (SAN).

It may be noted that, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "component," "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function (s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A computer device comprising a non-transitory memory, a processor, and a monitor, the processor configured to execute instructions in the non-transitory memory to display a graphical user interface (GUI) on the monitor for configuring timed events synchronized with recorded media, the GUI comprising:
    a plurality of fader bars configured to control individual intensities of a set of light channels, wherein a length of each fader bar represents a light intensity of a corresponding one channel of the set of light channels; and
    a media pane displayed with the plurality of fader bars, the media pane representing a timed progression of the recorded media over a lateral time axis, wherein each position on the lateral time axis represents a time instant during a given time duration of the recorded media, wherein each vertical position within the media pane represents a light intensity over a light intensity scale of the set of light channels,
        wherein the media pane includes one or more visual elements, each of the one or more visual elements having a lateral position indicating time and a vertical position indicating a light intensity over the light intensity scale of the set of light channels and configuring a timed event synchronized with a corresponding time instant of the recorded media, the at least one timed event to be triggered during a playback of the recorded media at the corresponding time instant,
        wherein the at least one timed event configured by a corresponding visual element includes triggering of at least one of the set of light channels at the corresponding time instant of the recorded media at a configured light intensity by controlling both: (1) one or more corresponding fader bars of the plurality of fader bars for controlling individual channel light intensity, and (2) a vertical position of the corresponding visual element for controlling a light intensity over the light intensity scale of the set of light channels.

2. The GUI of claim 1, wherein positioning a pointer of an input device over the corresponding visual element triggers a text box in the vicinity of the corresponding visual element, the text box displaying information relating to the configured at least one timed event, the information including at least one of the set of light channels, the light intensity over the light intensity scale of the set of light channels, or the time instant of the recorded media at which the visual element is configured.

3. The GUI of claim 1, further comprising:
    a play head that slides within the media pane along the lateral time axis, wherein a lateral position of the play head within the media pane represents a time instant during the recorded media, wherein positioning the play head over the visual element visually activates the configured at least one light channel and sets a length of the corresponding one of the fader bars to the configured light intensity.

4. The GUI of claim 1, wherein playing back the recorded media triggers the at least one timed event at the corresponding time instant of the configured visual element, wherein the triggering includes a visual activation of the configured at least one light channel and displaying a length of the corresponding one of the fader bars to the configured light intensity.

5. The GUI of claim 1, wherein a position of the visual element can be changed laterally within the media pane to change the time instant configured for the visual element to a different time instant of the recorded media.

6. The GUI of claim 1, wherein a position of the visual element can be changed vertically within the media pane to change the light intensity over the light intensity scale of the set of light channels to a different light intensity over the light intensity scale of the set of light channels.

7. The GUI of claim 1, wherein the visual element is visually connected by a solid line to a second visual element positioned at a second time instant within the media pane, wherein the solid line represents a change of light intensity of at least one of the configured at least one light channel between the visual element and the second visual element.

8. The GUI of claim 1, wherein the visual element is visually connected by a dotted line to a second visual element positioned at a second time instant within the media pane, wherein the dotted line represents no change of light intensity of the configured at least one light channel between the visual element and the second visual element.

9. The GUI of claim 1, further comprising a mechanism to jump to a next visual element or previous visual element within the media pane.

10. A method for operating a graphical user interface (GUI) for configuring timed events synchronized with recorded media, comprising:
    importing the recorded media into the GUI, wherein a media window in the GUI visually represents and allows playback of the recorded media, wherein a media pane in the GUI represents a timed progression of the recorded media over a lateral time axis, wherein each position on the time axis represents a time instant during a given time duration of the recorded media; and
    creating a set of visual elements in the media pane, each visual element configuring at least one timed event synchronized with a corresponding time instant of the recorded media, the at least one timed event to be triggered during a playback of the recorded media at the corresponding time instant, and each visual element configuring an intensity over an intensity scale of a set of light channels based on a vertical position in the media pane;
    adjusting a plurality of fader bars to control individual intensities of the set of light channels, wherein adjusting the plurality of fader bars comprises defining a length of each fader bar that represents a light intensity of a corresponding one channel of the set of light channels;
    wherein the at least one timed event configured by a corresponding visual element includes triggering of at least one of the set of light channels at the corresponding time instant of the recorded media at a configured light intensity by controlling both: (1) one or more corresponding fader bars of the plurality of fader bars for controlling individual channel light intensity, and (2) a vertical position of the corresponding visual element for controlling a light intensity over the light intensity scale of the set of light channels.

11. The method of claim 10, wherein creating the set of visual elements includes positioning a play head over the corresponding time instant in the media pane, wherein the play head slides within the media pane along the lateral time axis, wherein a lateral position of the play head within the media pane represents a time instant during the recorded media.

12. The method of claim 11, wherein creating the set of visual elements further includes:
    activating at least one light channel of the set of light channels;
    creating the visual element for the activated set of light channels in the media pane at the selected corresponding time instant at a default light intensity over the light intensity scale of the set of light channels; and
    defining a vertical position of the visual element within the media pane to set the light intensity of the set of light channels over the light intensity scale.

13. The method of claim 12, wherein creating the set of visual elements includes at least one of selecting a button on the GUI, depressing a key on a input keyboard, simultaneously depressing a combination of keys on the input keyboard, or a combination of depressing a key on the input keyboard and selecting a button on the GUI.

14. The method of claim 12, wherein activating the at least one light channel of the set of light channels includes: when the at least one light channel includes only one of the set of light channels, creating a corresponding visual element for the activated one of the light channels to define a light intensity over the light intensity scale, and setting on a corresponding fader bar an individual light intensity for the activated one of the light channels such that an output intensity of the activated one of the light channels equals to the light intensity over the light intensity scale multiplying the individual light intensity for the activated one of the light channels.

15. The method of claim 10, further comprising changing the time instant configured for one of the set of visual elements to a different time instant of the recorded media by changing a lateral position of the one of the set of visual elements in the media pane.

16. The method of claim 10, further comprising changing the configured light intensity to a different configured light intensity by changing a vertical position of a corresponding one of the visual elements in the media pane.

17. A computer device comprising a non-transitory memory, a processor, and a monitor, the processor configured to execute instructions in the non-transitory memory to display a graphical user interface (GUI) for configuring timed events synchronized with recorded media, the GUI comprising:
    a plurality of fader bars configured to control individual intensities of a set of light channels, wherein a length of each fader bar represents a light intensity of a corresponding one channel of the set of light channels; and
    a media pane displayed with the plurality of fader bars, the media pane representing a timed progression of the recorded media over a lateral time axis, wherein each position on the lateral time axis represents a time instant during a given time duration of the recorded media, wherein each vertical position within the media pane represents a light intensity over a light intensity scale of the set of light channels, wherein the media pane includes:

a play head that slides within the media pane along the lateral time axis, wherein a lateral position of the play head within the media pane represents a time instant during the recorded media, a set of visual elements, each of the set of visual elements having a lateral position indicating one timed event synchronized with a corresponding time instant of the recorded media, the at least one timed event to be triggered during a playback of the recorded media at the corresponding time instant, each of the set of visual elements further having a vertical position indicating a light intensity over the light intensity scale of the set of light channels, wherein the at least one timed event configured by the time stamp includes triggering of at least one of the set of light channels at the corresponding time instant of the recorded media at a configured light intensity by controlling both: (1) one or more corresponding fader bars of the plurality of fader bars for controlling individual channel light intensity, and (2) a vertical position of the corresponding visual element for controlling a light intensity over the light intensity scale of the set of light channels; and a timed event window for configuring one or more additional timed events for the set of visual elements, the additional timed events include triggering at least one additional light channel, transmitting a serial command or transmitting a network command.

18. The GUI of claim 17, wherein positioning the play head over one of the visual elements visually activates an arrangement of the plurality of the fader bars to show a configuration of the individual intensities of the set of light channels configured for that one of the visual elements.

19. The GUI of claim 17, wherein playing back the recorded media triggers the at least one timed event at the corresponding time instant of the set of visual elements, activates an arrangement of the plurality of the fader bars to show a configuration of the individual intensities of the set of light channels configured for the corresponding time instant.

* * * * *